United States Patent [19]

Höhlein et al.

[11] 4,255,530
[45] Mar. 10, 1981

[54] CROSS-LINKABLE LACQUER BINDER CONTAINING SATURATED LACTAM

[75] Inventors: Peter Höhlein; Jochen Schoeps, both of Krefeld, Fed. Rep. of Germany

[73] Assignee: Bayer Aktiengesellschaft, Fed. Rep. of Germany

[21] Appl. No.: 95,976

[22] Filed: Nov. 20, 1979

[30] Foreign Application Priority Data

Nov. 24, 1978 [DE] Fed. Rep. of Germany ....... 2850871

[51] Int. Cl.³ ............................................... C08L 33/08
[52] U.S. Cl. .............................. 525/6; 260/29.4 UA; 260/30.4 R; 260/33.4 R; 428/522; 525/119; 525/157; 525/178; 525/375; 525/419; 525/420
[58] Field of Search .................. 525/6, 178, 375, 419, 525/420; 260/30.4 R

[56] References Cited

U.S. PATENT DOCUMENTS 3,968,104  7/1976  Wagner ............................... 546/243

Primary Examiner—Harold D. Anderson
Attorney, Agent, or Firm—Connolly and Hutz

[57] ABSTRACT

A binder composition which comprises (A) from 99 to 50% by weight of copolymer consisting of copolymerized units of (a) from 5 to 90% by weight of at least one aliphatic (meth)acrylate containing from 1 to 8 carbon atoms in the alcohol moiety; (b) from 0 to 60% by weight of at least one aromatic vinyl or isopropylene compound containing from 8 to 14 carbon atoms; (c) from 1 to 40% by weight of at least one comonomer selected from (I) at least one mono (meth)acrylate of an alcohol containing from 2 to 8 carbon atoms and having from 2 to 4 hydroxyl groups; and/or (II) at least one maleic acid semi-ester corresponding to the following general formula

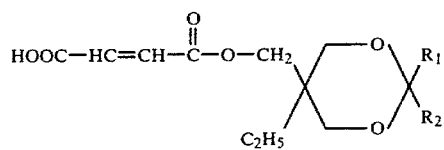

wherein $R_1$ represents hydrogen or methyl; and $R_2$ represents hydrogen, methyl, ethyl, propyl, i-propyl or phenyl; and (d) from 0 to 60% by weight of at least one other olefinically unsaturated comonomer; and (B) from 1 to 50% by weight of a saturated lactam.

3 Claims, No Drawings

CROSS-LINKABLE LACQUER BINDER CONTAINING SATURATED LACTAM

This invention relates to cross-linkable lacquer binders prepared from reactive copolymers and lactams, a process for the preparation thereof and the use thereof in coating compositions which are either solvent-free or contain a solvent and have a high solids content.

Copolymers containing hydroxyl groups which may be cross-linked by external cross-linking agents and worked-up with melamine resins or polyisocyanates to produce weather-resistant coatings and processes for the preparation thereof are known. These binders may be applied either as solutions or in the form of powders (see U.S. Pat. No. 3,753,958).

Protection of the environment, particularly the prevention of air and water pollution, has recently gained progressively in importance. It is therefore undesirable that numerous known coating compounds contaminate the atmosphere with the solvents contained in them when they are applied.

One method of completely eliminating solvents is to prepare lacquers in the form of powders, but this gives rise to new processing problems not found in the conventional method of lacquering using solutions. Particularly to be mentioned among these problems are the risk of dust explosion, the often poor levelling of the lacquer, the relatively high stoving temperatures and the need for extensive investment in new equipment. Reproducible production of definite colour shades also frequently entails considerable technical difficulties. Increasing interest is therefore accorded to the other method of developing lacquers which are environmentally comparatively harmless, namely the production of binder systems which have a high solids content.

In numerous processes which have been described (see Brit. Pat. Nos. 1,393,273; 1,431,446 and 1,515,868), it is attempted to obtain OH functional copolymers having a high solids content by aiming at low molecular weights and narrow molecular weight distributions. It is known in the art that there are limits to such an endeavour in that the properties of film must be expected to deteriorate below a certain degree of polymerisation. Thus, a high level of hardness and elasticity may hardly be achieved using such binder systems in the oligomeric range with molecular weights below 1000. Furthermore, considerable economical disadvantages arise from the fact that larger quantities of initiators and/or regulators must be used to reduce the molecular weight.

These disadvantages may be avoided by obtaining the higher solids content not by a reduction in the molecular weight of the resin, but by the use of reactive diluents. Thus, German Offenlegungsschrift No. 2,314,044 discloses coating compositions having a high solids content in which the hydroxyl functional copolymers are prepared in the presence of a reactive liquid having at least one hydroxyl group. Low molecular weight mono- or poly-hydric alcohols or higher molecular weight hydroxyl functional polycondensates or polymers are preferably used for this purpose, although lower alcohols, such as butane diol or glycerol, have poor compatibility with the copolymers, so that separation is liable to occur; on the other hand, relatively high molecular weight polycondensates or polymers frequently give rise to unduly high viscosities so that comparatively large quantities of solvent must be added, if, for example, the lacquers are to be applied by spraying (see Brit. Pat. No. 1,524,613). In addition, there is the risk that compounds having melting points above room temperature (e.g. hydroxypivalic acid-neopentylglycol ester, melting point 51° C.) may crystallise from the resin solution on cooling, thus causing separation.

Another method of substantially eliminating the use of organic solvents consists of preparing copolymer resins which may be diluted with water, but these have the disadvantage of requiring the addition of considerable quantities of organic auxiliary solvents (e.g. alcohols) to enable the neutralized resins to be sufficiently diluted with water without causing any viscosity anomalies.

It is an object of the present invention to prepare lacquer binders which may be cross-linked with external cross-linking agents and used in coating compositions which are either solvent-free or contain solvent, but have a high solids content and may be diluted with water. The term "solvent-free" used in this context means free from conventional solvents which are not and cannot be chemically changed during drying or hardening (cross-linking) of the lacquer film.

The present invention relates to a cross-linkable lacquer binder comprising a mixture of:

(A) from 99% to 50%, by weight, preferably from 95 to 60%, by weight, of a copolymer consisting of copolymerised units of:
  (a) from 5 to 90%, by weight, of an ester of acrylic or methacrylic acid having from 1 to 8 carbon atoms in the aliphatic alcohol component or mixtures thereof;
  (b) from 0 to 60%, by weight, of an aromatic vinyl or isopropylene compound having from 8 to 14 carbon atoms or mixtures thereof;
  (c) from 1 to 40%, by weight, of at least one copolymerisable mono-ester from the following groups:
    (I) Mono-esters of acrylic or methacrylic acids and an alcohol having a valency of from 2 to 4 having from 2 to 8 carbon atoms or mixtures thereof;
    (II) Maleic acid semi-esters corresponding to the following general formula:

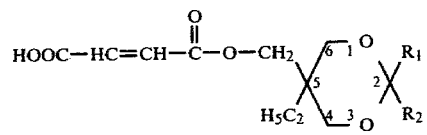

wherein $R_1$ represents H or methyl; and $R_2$ represents H, methyl, ethyl, propyl, isopropyl or phenyl;
    (III) mono-esters selected from (I) and (II); and
  (d) from 0 to 60%, by weight, of an olefinically unsaturated copolymerisable monomer not mentioned under (a) to (c); and
(B) from 1 to 50%, by weight, preferably from 5 to 40%, by weight, of a saturated lactam.

Examples of compounds of the individual groups are given below by name or formula:

Group (A)(a): ethyl acrylate, methylacrylate, n- and i-propyl acrylate, n-butyl acrylate, 2-ethylhexylacrylate, 2-ethylhexylmethacrylate, isooctylacrylate, t-butyl acrylate, methylmethacrylate, ethyl methacrylate, n- and i-propylmethacrylate, butyl methacrylates, i-octylmethacrylate and mixtures thereof; (meth)acrylic acid alkyl esters having from 1 to 4 carbon atoms in the alcohol component are preferred.

Group (A)(b): styrene, α-methylstyrene, o- and p-chlorostyrene, o-, m- and p-methylstyrene, p-t-butylstyrene and mixtures thereof; styrene is preferred.

Group (A)(c): 2-hydroxyethyl(meth)acrylate, 2-hydroxypropyl(meth)acrylate, 4-hydroxybutyl(meth)acrylate, trimethylolpropane mono(meth)acrylate, pentaerythritolmono(meth)acrylate and mixtures thereof; 2-hydroxypropyl(meth)acrylate is preferred.

(II) (5-ethyl-5-m-dioxanyl)methyl-maleic acid semi-ester, (2-methyl-5-ethyl-5-m-dioxanyl)methyl-maleic acid semi-ester, (2,5-diethyl-5-m-dioxanyl)methyl-maleic acid semi-ester, (2-propyl-5-ethyl-5-m-dioxanyl)methyl-maleic acid semi-ester, (2-isopropyl-5-ethyl-5-m-dioxanyl)-methyl-maleic acid semi-ester, (2-phenyl-5-ethyl-5-m-dioxanyl)-methyl-maleic acid semi-ester, (2,2-dimethyl-5-ethyl-5-m-dioxanyl)-methyl-maleic acid semi-ester or mixtures thereof.

Group (A)(d): acrylic acid, methacrylic acid; fumaric acid, itaconic acid, maleic acid, semi-esters of the above-mentioned dicarboxylic acids having from 4 to 8 carbon atoms in the alcohol component, glycidyl methacrylate and reaction products thereof with saturated and/or unsaturated aliphatic and/or aromatic monocarboxylic acids or fatty acid mixtures; acrylonitrile, (meth)-acrylic acid amides, vinyl esters of alkane mono-carboxylic acids having from 2 to 5 carbon atoms, such as vinyl acetate or vinyl propionate, or mixtures of the above-mentioned monomers, preferably acrylic acid and/or methacrylic acid.

The monomers of group (A)(d) containing carboxyl groups may be reacted with glycidyl compounds, such as glycidol or glycidyl esters of monocarboxylic acids having from 8 to 20 preferably from 10 to 16, carbon atoms, either before, during or after polymerisation.

The glycidyl compounds of group (A)(d) enable the cross-linking using compounds containing carboxyl groups to take place via the chemically reactive epoxide group and serve to modify the polyacrylate resin by the addition of fatty acids, air drying polyacrylate resins being obtainable in the case of unsaturated fatty acids.

Group (B): Lactams corresponding to the following general formula:

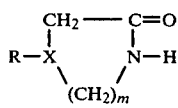

wherein
when X represents CH,
  R represents hydrogen and
  m represents 0 or an integer of from 1 to 9; or
when X represents N,
  R represents a saturated aliphatic group, preferably methyl, an araliphatic group having from 7 to 12 carbon atoms or an unsubstituted pyridine group or a pyridine group substituted by one or more lower alkyl groups ($C_1$–$C_4$), and
  m represents 3.

The following lactams are preferred: 1-N-methylhexahydro-1,4-diazepinone-3; ω-dodecyllactam; γ-butyrolactam; δ-valerolactam; particularly ε-caprolactam.

Preparation of the maleic acid semi-esters (monomers of Group (A)(c)(II) from maleic acid anhydride and substituted 1,3-dioxanes may be carried out by heating equimolar quantities of the starting components at from 60° to 80° C. until the acid number of the maleic acid semi-ester is reached. The products obtained are viscous and the purity thereof has been investigated by gel permeation chromatography.

The substituted 1,3-dioxanes were prepared according to a general method from equimolar quantities of trimethylol propane and the corresponding aldehydes under conditions of acid catalysis using commercial ion exchange resins containing carboxyl groups and elimination of the water produced in the reaction at 100° C. These compounds were isolated by extraction with ether and purified by fractional distillation. The following compounds having the indices given were obtained:

| Starting materials | | End products = substituted 1,3-dioxanes |
|---|---|---|
| | +Formaldehyde | 5-ethyl-5-hydroxymethyl-dioxane-1,3<br>bp: 77–78.5° C./0.7 mm Hg<br>$n_D^{20}$: 1.4638 (see U.S. Pat. No. 4,076,727, Example 1) |
| | +Acetaldehyde<br>bp: 107–109° C./1.5 mm Hg | 2-methyl-5-ethyl-5-hydroxymethyl-dioxane-1,3<br>$n_D^{20}$: 1.4570 |
| Tri-methylol-propane | +Propionaldehyde | 2,5-diethyl-5-hydroxymethyl dioxane-1,3<br>bp: 78° C./0.2 mm Hg<br>$n_D^{20}$: 1.4581 |
| | +Butyraldehyde | 2-propyl-5-ethyl-5-hydroxymethyl-dioxane-1,3<br>bp: 93° C./0.2 mm Hg<br>$n_D^{20}$: 1.4575 |
| | +Isobutyraldehyde | 2-isopropyl-5-ethyl-5-hydroxy methyl-dioxane-1,3<br>bp: 81° C./0.3 mm Hg<br>$n_D^{20}$: 1.4575 |
| | +Benzaldehyde | 2-phenyl-5-enyl-5-hydroxy-methyl-dioxane-1,3<br>bp: 133° C./0.3 mm Hg<br>$n_D^{20}$: 1.5287 |
| | +Acetone | 2,2-dimethyl-5-ethyl-5-hydroxymethyl-dioxane-1,3<br>bp: 85° C./0.5 mm Hg<br>$n_D^{20}$: 1.4578 |

*Method: Analogous to that of E. Hannig, H. Wilhelm. Pharmazie 24 (1), 32 (1969)

The copolymer resin (component (A)) may be prepared by copolymerisation of components (a)–(d) by the conventional methods, preferably by radical polymerisation either solvent-free or in solution. Polymerisation may be carried out at temperatures of from 70° to 160° C., preferably from 100° to 150° C.

Monomers (a)–(d) are mainly built into the copolymer resin in the same proportions as they are used for polymerisation and the incorporated polymerised units are mainly statistically distributed.

The following are examples of preferred initiators for carrying out radical polymerisation: symmetric aliphatic azo compounds, such as azo-bis-butyric acid nitrile, azo-bis-2-methyl-valeronitrile, 1,1′-azo-bis-1-cyclohexane nitrile and 2,2′-azo-bis-isobutyric acid alkyl esters; symmetric diacyl peroxides, such as acetyl, propionyl or butyryl peroxide, benzoyl peroxides substituted with bromo-, nitro-, methyl- or methoxy- and lauroyl peroxide; symmetric peroxydicarbonates, such as diethyl, diisopropyl, dicyclohexyl and dibenzyl peroxydicarbonate; t-butyl peroctoate or t-butyl phenyl peracetate and peroxy carbonates, such as t-butyl-N-(phenylperoxy)-carbamate or t-butyl-N-(2,3-dichloro- or 4-chlorophenylperoxy)-carbamate. The following peroxides are also preferred: t-butylhydroperoxide, di-t-butyl peroxide, cumene hydroperoxide, dicumene peroxide and t-butyl perpivalate.

The initiators may be used in quantities of from 0.2 to 8.0%, by weight, based on the total quantity of monomers. The conventional regulators may also be used for polymerisation in quantities of from 0.1 to 5%, by weight, based on the total quantity of monomers.

For polymerisation in solution, inert solvents, such as ethanol, propanol, isopropanol, n- or i-butanol, methyl ethyl ketone, toluene, xylene, butyl acetate or butyl glycol, may be used.

It is particularly advantageous to copolymerise monomers (a)–(d) in the presence of component (B) i.e. the lactams. The binders according to the present invention are in that case obtained directly and, depending on the choice of monomer compositions, they may be further worked-up either into lacquers which are used in the conventional manner or into lacquers which may be diluted with water, and no problems of comparibility or phenomena of crystalisation occur. If desired, the above-mentioned solvents may be used in addition to the lactam in quantities of up to 95%, by weight, based on the lactam.

Since the lactams used are saturated, they do not undergo a copolymerisation reaction with the monomers, but react with a cross-linking agent via the reaction NH group thereof. The lactams used are mainly non-volatile and are therefore left in the film as it hardens.

The copolymers or the binders (=copolymer+lactam) may be freed from volatile constituents at temperatures of from 140° to 200° C. after they have been prepared and possibly modified. This removal of volatile constituents may be carried out, for example, at normal pressure in evaporator coils by injecting an inert gas, such as nitrogen or steam, in quantities of from 0.1 to 1 m³ per kg of resin melt or it may be carried out under a vacuum in evaporation apparatus, such as falling film evaporators, thin layer evaporators, evaporator screws, depressurising, evaporators or spray evaporators. The conditions are chosen so that the lactam remains in the binder.

The average molecular weight and molecular non-uniformities of the copolymers were determined by gel permeation chromatography (GPC) using styragels with tetrahydrofuran as eluant. After universal calibration (according to Z. Grubisic, P. Rempp and H. Benoit, J. Polymer Sci, Part B, Polymer letters 5 (1967) 753), the average molecular weights, $\overline{M}_w$ and $\overline{M}_n$ were determined from the distribution of the chromatograms. The polymers have average molecular weights $\overline{M}_n$ of from 500 to 50,000, preferably from 2000 to 25,000, and molecular weight nonuniformities U ($U=\overline{M}_w/\overline{M}_n - 1$; $M_w$ =average weight, $\overline{M}_n$ =numerical average of molecular weight) of from 0.5 to 30.

When the copolymers have been prepared, they are mixed with lactams in the proportions according to the present invention. If polymerisation has been carried out in a lactam, the polymer is not subsequently mixed with lactam or the lactam may be made up to the required quantity within the limits according to the present invention.

The term "lactam" is used herein to include the addition products of the above-mentioned lactams with monohydric aliphatic, saturated $C_1$–$C_{10}$ alcohols or with $C_2$–$C_8$ glycols or with polyglycols having 3 or 4 OH groups, such as glycerol, trimethylol propane, pentaerythritol.

The addition products contain from 0.2 to 5 mols of the above-mentioned mono- or poly-hydric alcohols per mol of lactam. Such addition products have been described in U.S. Pat. No. 3,968,104. The free lactams are preferably contained in the binders.

The binders according to the present invention may be used in coating either solvent-free or dissolved in organic solvents.

Suitable organic solvents include the conventional lacquer solvents, such as alcohols having from 1 to 4 carbon atoms, such as methanol, ethanol, n- and i-propanol and butanols; acetic acid esters having from 2 to 4 carbon-atoms in the alcohol component, such as ethyl acetate and butyl acetate or ethyl glycol acetate; ethylene glycol monoalkyl ethers having from 1 to 4 carbon atoms in the alkyl groups, such as ethylene glycol monomethyl-, ethyl- and butyl-ether; aliphatic and alicyclic ketones, such as methyl ethyl ketone, methyl isobutyl ketone, cyclohexanone or acetone; cyclic ethers, such as tetrahydrofuran; chlorinated hydrocarbons, such as trichloroethylene; aromatic hydrocarbons, such as benzene, toluene or xylene, or mixtures of the above-mentioned solvents.

If acid copolymer resins obtained are to be used as water-dilutable binders, they are neutralised using an amine or alkali in the conventional manner and adjusted to the desired viscosity using water.

The coating compounds may have solids contents of from 60 to 100%, by weight.

Numerous classes of compounds may be used for cross-linking the binders according to the present invention. Aminoplast resins, epoxide resins and compounds having isocyanate end groups are particularly suitable. These substances are on the whole non-volatile and undergo a cross-linking reaction with the copolymers through exceptionally reaction groups, such as methylol, methylolether, epoxy and isocyanate groups.

Examples of suitable aminoplast resins include amine aldehyde resins, i.e. aldehyde condensation products of melamine, urea or acetoguanamine. The aldehyde used is generally formaldehyde, although suitable products may also be obtained using other aldehydes, such as acetaldehyde, crotonaldehyde, acrolein, benzaldehyde and furfuryl aldehyde. Melamine resins and urea resins are prepared although condensation products of other amines or amides may also be used.

Examples of suitable aminoplast resins include malamine/formaldehyde condensation products and urea/formaldehyde condensation products. The term "melamine resins" is used to include all conventional melamine/formaldehyde condensates which may be unetherified or etherified with saturated monohydric alcohols having from 1 to 4 carbon atoms, e.g. the condensates described in French Pat. No. 943,411 or by D. H. Solomon in "The Chemistry of Organic Film-formers", 235–240, John Wiley & Sons, Inc., New York, 1967. The melamine resins may also be partly or completely replaced by other cross-linking aminoplasts, such as those described, for example, in "Methoden der organischen Chemie" (Houben-Weyl), Volume 14/2, Part 2, 4th Edition, Georg Thieme-Verlag, Stuttgart, 1963, 319 Et seq.

The aminoplast resins may be used in quantities of from 10 to 50%, by weight, based on the binder.

The polyepoxides having more than one 1,2-epoxide group per molecule which may be used as cross-linking agents may also vary considerably in the chemical structure thereof. The polyepoxide compounds used may be polyglycidyl ethers of polyhydric phenols, such as pyrocatechol, resorcinol or hydroquinone, or of 4,4'-dihydroxydiphenyl methane, 4,4'-dihydroxy-3,3'-dimethyldiphenylmethane, 4,4'-dihydroxydiphenyldimethylmethane (bisphenol A), 4,4'-dihydroxy-diphenylmethylmethane, 4,4'-dihydroxydiphenylcyclohexane, 4,4'-dihydroxy-3,3'-dimethyl-diphenylpropane, 4,4'-dihydroxydiphenyl, 4,4'-dihydroxy-diphenylsulphone, or of tris-(4-hydoxyphenyl)-methane, or of the chlorination and bromination products of the above-mentioned diphenols, in particular of bisphenol A; or polyglycidyl ethers of novolaks (i.e. reaction products of mono- or higher hydric phenols and aldehydes, in particular formaldehyde, obtained in the presence of acid catalysts), of diphenols obtained by the esterification of 2 mols of the sodium salt of an aromatic hydroxycarboxylic acid with 1 mol of a dihalogen alkane or a dihalogen dialkyl ether (see British Pat. No. 1,017,612), or of polyphenols obtained by the condensation of phenols with long chain halogenated paraffins having at least two halogen atoms (see British Pat. No. 1,024,288).

Apart from epoxide resins based on a polyhydric phenol and a chloroepoxy compound, there may also be used the epoxidised ring compounds according to U.S. Pat. No. 2,716,123.

Further examples include glycidyl ethers of polyhydric alcohols such as the glycidyl ethers of 1,4-butane diol, 1,4-butane diol, glycerol, trimethylolpropane, pentacerythritol and polyethylene glycols.

The following compounds are also of interest: triglycidyl isocyanurate, N,N'-diepoxypropyloxyamide, polyglycidyl thioethers of polyhydric thiols, such as those of bis-mercaptomethyl benzene, diglycidyl-trimethylene-trisulphone, epoxidised polybutadiene, epoxidised linseed oil or vinyl-cyclohexene-diepoxide.

The following may also be used: glycidyl esters of polybasic aromatic, aliphatic and cycloaliphatic carboxylic acids, for example, phthalic acid diglycidyl ester, terephthalic acid diglycidyl ester, tetrahydrophthalic acid diglycidyl ester, tetrahydrophthalic acid diglycidyl ester, adipic acid diglycidyl ester, and hexahydrophthalic acid diglycidyl ester, which may optionally be substituted by methyl groups; and glycidyl esters of reaction products of 1 mol of an aromatic or cycloaliphatic dicarboxylic acid anhydride and ½ mol of a diol or 1/n mol of a polyol having n hydroxyl groups, such as glycidyl carboxylic acid esters corresponding to the following general formula:

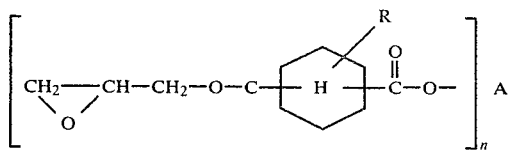

wherein A represents an at least divalent aliphatic hydrocarbon group optionally interrupted by oxygen and-/or by cycloaliphatic rings, of the divalent group of a cycloaliphatic hydrocarbon; R represents hydrogen or alkyl groups having from 1 to 3 carbon atoms; and n represents a number of from 2 to 6; or mixtures of glycidyl carboxylic acid esters corresponding to the above general formula (see British Pat. No. 1,220,702).

The polyepoxides are used in such quantities that from 0.6 to 1.4 gram equivalents of carboxyl and/or hydroxyl groups are available per 1,2-epoxide group.

Epoxide resins which have been reacted with monocarboxylic acids are of particular interest, especially those which have been reacted with fatty acids, such as those obtained from linseed oil, soya bean oil, saffranine oil, perilla oil, tung oil proppyseed oil, sunflower oil, tall oil, walnut oil, dehydrated castor oil, herring oil and the like. The epoxide resins are easily esterified by heating them under reflux in the presence of one or more carboxylic acids and at the same time removing the water azeotropically.

The epoxide resins esterified with fatty acids may be used in quantities of from 10 to 50%, by weight, based on the binder.

The compounds which may be used as cross-linking agents also include compounds having isocyanate end groups, e.g. polyisocyanates, such as the aliphatic trimethylene, tetramethylene, pentamethylene, hexamethylene, 1,2-propylene, 1,2-butylene, 2,3-butylene, 1,3-butylene, ethylidene and butylidene diisocyanates; cycloalkylene diisocyanates, such as 1,3-cyclopentane, 1,4-cyclohexane and 1,2-cyclohexane diisocyanates; aromatic diisocyanates, such as m-phenylene, p-phenylene, 4,4'-diphenyl, 1,5-naphthalene, and 1,4-naphthalene diisocyanates; aliphatic-aromatic diisocyanates, such as 4,4'-diphenylmethane, 2,4- or 2,6-tolylene (or mixtures thereof), 4,4'-toluidine and 1,4-xylylene diisocyanates; aromatic compounds substituted in the nucleus, such as dianisidine diisocyanates, 4,4'-diphenylether diisocyanate and chlorodiphenylene diisocyanate; triisocyanates, such as triphenylmethane-4,4'4"-triisocyanate, 1,3,5-benzene triisocyanate and 2,4,6-toluene triisocyanate and tetraisocyanates such as 4,4'-diphenyl-dimethyldimethane 2,2'-5,5'-tetraisocyanate; and polymerised polyisocyanates, such as dimeric and trimeric tolylene diisocyanate, and the like.

The organic polyisocyanate may also be a prepolymer derived from a polyol, including a polyether polyol or a polyester polyol and including polyethers which have been reacted with an excess of polyisocyanates to form compounds carrying isocyanate end groups. The prepolymers may be prepared from simple polyols, e.g. from glycols, such as ethylene glycol and propylene glycol, glycerol, trimethylolpropane, hexane triol, pentacerythritol and the like, or from monoethers, such as diethylene glycol, tripropylene glycol and similar polyethers, i.e. alkylene oxide condensates of the compounds mentioned above. Among the alkylene oxides which may be reacted with these polyols to form polyethers, the best known are ethylene oxide, propylene oxide, butylene oxide, styrene oxide and the like.

If a compound having an isocyanate end group is used as cross-linking agent, the molar ratio of this compound to the copolymers containing hydroxyl groups is preferably in the region of about 1:1.

The coatings prepared from the binders according to the present invention may contain pigments, such as titanium dioxide, carbon black talcum, barium sulphate, zinc sulphate, strontium chromate, barium chromate or iron oxide, as well as coloured pigments such as cadmium yellow, cadmium red, toluidine red, hydrated iron oxide or the like, so that any desired colour may be obtained and the film properties may be varied. Blending of the resinous carrier with the pigment formulation is carried out in accordance with well known methods.

The binders according to the present invention may be mixed with other oligomers, such as polyesters and alkyd resins or silicone resins, in any proportions in order to obtain particular properties. They may also be mixed with the conventional lacquer auxiliaries, such as cellulose esters, levelling agents, silicone oils, plasticizers and thioxotropic agents in the conventional quantities.

The coating compounds prepared in this manner may be applied by the conventional methods, e.g. by coating using reversal rollers spraying, spread coating and immersion or similar conventional methods.

The substrates which may be covered or coated with these compounds include metals, wood, paper, cardboard, textiles, leather glass, synthetic materials, ceramic materials, etc.

The conditions required for hardening depend upon the substrate and the composition of the coating compound. When cross-linking is carried out using hardeners containing isocyanate groups or epoxide resins modified with drying fatty acids, hardening may begin at room temperature, but it will generally take place at temperatures of from 80° to 250° C., and the conditions should be selected so that the lactam does not evaporate prematurely. It is sometimes advantageous to begin hardening at temperatures below 120° C. and complete it at temperatures above 120° C.

The coating compounds prepared with the binders according to the present invention give rise to coatings which when hardened have advantageous characteristics for practical application and good weathering resistance.

The parts and percentages indicated in the Examples are based on weight, unless otherwise indicated.

EXAMPLE 1

A reactor equipped with heating means, automatic temperature control, stirrer, metering device, reflux condenser and nitrogen inlet was charged with 998.7 parts of a trimethylolpropane/ε-caprolactam adduct in a molar ratio of 1:2 and heated to 110° C. The reactive mixture was maintained under isothermal conditions while a mixture of 766.5 parts of styrene, 546.0 parts of a semi-ester obtained from 5-hydroxymethyl-5-ethyl-dioxane-1,3- and maleic acid anhydride in a molar ratio of 1:1 449.1 parts of n-butyl acrylate and 9.0 parts of mercaptoethanol were added with stirring within 3 hours. At the same time, an initiator mixture of 59.4 parts of t-butylperoctoate and 171.3 parts of the adduct described above was added over a period of 4 hours. Stirring was continued for 3 hours at 110° C. after all the mixture had been added and the product was then filtered under pressure. The resulting binder, consisting mainly of a mixture of the copolymer and lactam addition product, was obtained in a yield of ca.96%, based on the sum of monomers and lactam addition product.

EXAMPLE 2

The procedure employed in this Example was analogous to that of the previous Example. 998.7 parts of ε-caprolactam were introduced into the reactor. A monomer mixture consisting of 766.5 parts of styrene, 546 parts of the maleic acid semi-ester used in Example 1, 449.1 parts of n-butyl acrylate and 9 parts of mercaptoethanol and a mixture of 59.4 parts of t-butyl peroctoate and 171.3 parts of butyl glycol were added at 110° C. in the same manner as in Example 1. After stirring and removal of the volatile constituents at temperatures of up to 150° C., a cross-linkable resin consisting of a mixture of copolymer and lactam (binder) was obtained in a yield of 98%.

Since the procedure employed in all the following Examples 3 to 16 was analogous to that employed in Example 1, only the starting materials used for the preparation of the binders have been tabulated (see Table 1).

Preparation of a coating compound 83.4 parts of the binder prepared according to Examples 1 to 16 and free from volatile constituents, 16.6 parts of a commercial melamine/formaldehyde resin etherified with methanol (e.g. Resimene 745 ™, product of Monosanto), 67 parts of butyl glycol/water mixture (volmetric ratio 1:1), 80 parts of titanium dioxide (rutile type/, 2.0 parts of a commercial levelling agent and 1 part of p-toluene sulphonic acid (10% in isopropanol) are triturated in a roller mill for 10 minutes. The resulting coating composition is applied to degreased steel sheets in a layer 40μ in thickness and stoved at 150° C. for 30 minutes. The usage characteristics of the stoved films are shown in Table 2.

TABLE 1

Composition of the starting components for binders according to the present invention

| Composition (parts by weight) | Examples | | | | |
|---|---|---|---|---|---|
| | 3 | 4 | 5 | 6 | 7 |
| ε-caprolactam | 998.7 | 998.7 | 750.0 | 750.0 | 750.0 |
| Butylglycol | 171.3 | 162.3 | 171.3 | 171.3 | 171.3 |
| Xylene | — | — | — | — | — |
| Styrene | 466.5 | 466.5 | 678.3 | 672.3 | 667.2 |
| Butyl acrylate | 600.0 | 749.1 | 909.0 | 900.3 | 891.0 |
| Acrylate acid | 149.1 | — | 138.6 | 138.6 | 138.6 |
| Hydroxypropyl-methacrylate | — | — | — | — | — |
| Methyl methacrylate | — | — | — | — | — |
| Maleic acid semi-ester** | 546.0(1) | 546.0(1) | 253.8(1) | 268.5(2) | 282.9(3) |
| t-butyl peroctoate | 59.4 | 59.4 | 75.0 | 75.0 | 75.0 |
| Mercapto-ethanol | 9.0 | 18.0 | 24.0 | 24.0 | 24.0 |

| Composition (parts, by weight) | Examples | | | | |
|---|---|---|---|---|---|
| | 8 | 9 | 10 | 11 | 12 |
| ε-caprolactam | 600.0 | 600.0 | 600.0 | 600.0 | 600.0 |
| Butylglycol | 321.3 | 321.3 | 321.3 | 321.3 | 321.3 |
| Xylene | — | — | — | — | — |
| Styrene | 678.3 | 672.3 | 667.2 | 658.5 | 659.1 |
| Butyl acrylate | 909.0 | 900.3 | 891.0 | 885.5 | 882.2 |
| Acrylate acid | 138.6 | 138.6 | 138.6 | 138.6 | 138.6 |
| Hydroxypropyl-methacrylate | — | — | — | — | — |
| methyl methacrylate | — | — | — | — | — |
| Maleic acid semi-ester** | 253.8(1) | 268.5(2) | 282.9(3) | 297.6(4) | 300.0(5) |
| t. butyl peroctoate | 75.0 | 75.0 | 75.0 | 75.0 | 75.0 |
| Mercapto-ethanol | 24.0 | 24.0 | 24.0 | 24.0 | 24.0 |

| composition (parts, by weight) | Examples | | | |
|---|---|---|---|---|
| | 13 | 14 | 15* | 16 |
| ε-caprolactam | 600.0 | 600.0 | 600.0 | 600.0 |
| Butyl glycol | 321.3 | 321.3 | 171.3 | — |
| Xylene | — | — | — | 595.5 |
| Styrene | 659.1 | 654.1 | 729.5 | 822.9 |
| Butyl acetate | 882.0 | 867.0 | 978.0 | 528.3 |
| Acrylate acid | 138.6 | 138.6 | 149.2 | 11.4 |
| Hydroxypropyl-methacrylate | — | — | — | 336.6 |
| Methyl |

TABLE 1-continued

Composition of the starting components for binders according to the present invention

| | | | | |
|---|---|---|---|---|
| methacrylate | — | — | — | 34.5 |
| Maleic acid semi-ester** | 300.0[6] | 320.0[7] | 273.0[1] | — |
| t. butyl peroctoate | 75.0 | 75.0 | 75.0 | 59.4 |
| Mercapto-ethanol | 24.0 | 24.0 | 24.0 | 11.4 |

**
[1] (5-ethyl-5-m-dioxanyl)-methyl-maleic acid semi-ester
[2] (2-methyl-5-ethyl-5-m-dioxanyl)-methyl-maleic acid semi-ester
[3] (2,2-dimethyl-5-ethyl-5-m-dioxanyl)-methyl-maleic acid semi-ester
[4] (2-ethyl-5-ethyl-5-m-dioxanyl)-methyl-maleic acid semi-ester
[5] (2-propy-5-ethyl-5-m-dioxanyl)-methyl-maleic acid semi-ester
[6] (2-i-propyl-5-ethyl-5-m-dioxanyl)-methyl-maleic acid semi-ester
[7] (2-phenyl-5-ethyl-5-m-dioxanyl)-methyl-maleic acid semi-ester
*In this Example maleic acid semi-ester was introduced into the reaction vessel together with ε-caprolactam

TABLE 2

Usage characteristics of coating obtained from the binders according to present invention.

| Experimental results | Examples | | | |
|---|---|---|---|---|
| | 1 | 2 | 3 | 4 |
| Acid number of the copolymer mg/KOH/g substance (DIN 53 402) | 64 | 72 | 75 | 42 |
| Gloss according to Gardner (<20°) (ASTM 523) | 16 | 82 | 64 | 39 |
| Yellowing (Elrepho) | 68.9 | 78.7 | 76.2 | 69.2 |
| Pendulum hardness according to Konig (sec) | 152 | 145 | 151 | 61 |
| Bond strength (grid section) (DIN 53 151) | 1 | 1 | 0.5 | 0.5 |
| Erichsen elongation (mm) (DIN 53 156) | 2.5 | 4.4 | 3.0 | 6.1 |

| Experimental results | Examples | | | |
|---|---|---|---|---|
| | 5 | 6 | 7 | 8 |
| Acid number of the copolymer mg KOH/g substanes (DIN 53 402) | 54 | 54 | 52 | 53 |
| Gloss according to Gardner (20°) (ASTM 523) | 76 | 75 | 70 | 72 |
| Yellowing (Elrepho) | 78.6 | 80.7 | 82.6 | 81.0 |
| Pendulum hardness according to Konig (sec) | 120 | 94 | 89 | 89 |
| Bond strength (grid section) (DIN 55 151) | 1 | 0.5 | 0.5 | 1 |
| Erichsen elongation (mm) (DIN 53 156) | 5.2 | 6.9 | 7.0 | 7.3 |

| Experimental results | Examples | | | |
|---|---|---|---|---|
| | 9 | 10 | 11 | 12 |
| Acid number of the copolymer mg KOH/g substance (DIN 55 402) | 52 | 52 | 54 | 49 |
| Gloss according to Gardner (<20°) (ASTM 523) | 77 | 70 | 67 | 74 |
| Yellowing (Elrepho) | 80.4 | 78.4 | 68.8 | 77 |
| Pendulum hardness according to Konig (sec) | 83 | 97 | 85 | 77 |
| Bond strength (grid section) (DID 53 151) | 1 | 0.5 | 1 | 0.5 |
| Erichsen elongation (mm) (DIN 53 156) | 7.0 | 6.9 | 8.1 | 8.3 |

| Experimental results | Examples | | | |
|---|---|---|---|---|
| | 13 | 14 | 15 | 16 |
| Acid number of the copolymer mg KOH/g substance (DIN 53 402) | 50 | 50 | 54 | 10 |
| Gloss according to Gardner (<20°) (ASTM 523) | 68 | 71 | 75 | 78 |
| Yellowing (Elrepho) | 64.4 | 76.0 | 77 | 79 |
| Pendulum hardness according to Konig (sec) | 84 | 87 | 89 | 88 |
| Bond strength (grid section) (DIN 53 151) | 0.5 | 0.5 | 0.5 | 0.5 |
| Erichen elongation (mm) (DIN 53 156) | 7.6 | 7.6 | 7.9 | 7.6 |

We claim:

1. A binder composition which comprises
(A) from 99 to 50%, by weight based on the weight of (A) plus (B), of a copolymer consisting of copolymerized units of
 (a) from 5 to 90%, by weight based on the copolymer, of at least one aliphatic (meth) acrylate containing from 1 to 8 carbon atoms in the alcohol moiety;
 (b) from 0 to 60%, by weight based on the copolymer, of at least one aromatic vinyl or isopropylene compound containing from 8 to 14 carbon atoms;
 (c) from 1 to 40%, by weight based on the copolymer, of at least one comonomer selected from the group consisting of
  (I) at least one mono (meth) acrylate of an alcohol containing from 2 to 8 carbon atoms and having from 2 to 4 hydroxyl groups and
  (II) at least one maleic acid semi-ester corresponding to the formula

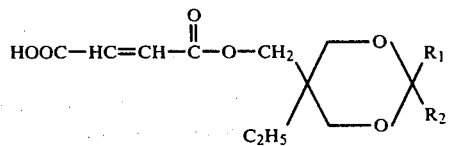

wherein
$R_1$ is hydrogen or methyl; and
$R_2$ is hydrogen, methyl, ethyl, propyl, i-propyl or phenyl;

(d) from 0 to 60%, by weight based on the copolymer, of at least one other olefinically unsaturated comonomer;

and (B) from 1 to 50%, by weight based on the weight of (A) plus (B), of a saturated lactam.

2. A composition as claimed in claim 1 wherein (B) is of the formula

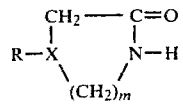

wherein
when X is CH,
R is hydrogen and
m is zero or an integer of from 1 to 9
and when X is nitrogen,
R is a saturated aliphatic group, an araliphatic group containing from 7 to 12 carbon atoms, pyridine or pyridine substituted at least once by $C_1$–$C_4$ alkyl and
m is 3.

3. A composition as claimed in claim 1 wherein (B) is selected from the group consisting of 1-N-methylhexahydro-1,4-diazepinone-3; ω-dodecyllactam; γ-butyrolactam; δ-valerolactam and ε-caprolactam.